J. J. STAFFORD, H. C. RHODEHAMEL AND E. J. SCHOENLAUB.
AUTOMATIC SLIDE VALVE.
APPLICATION FILED AUG. 2, 1918.
1,315,797.
Patented Sept. 9, 1919.
2 SHEETS—SHEET 1.
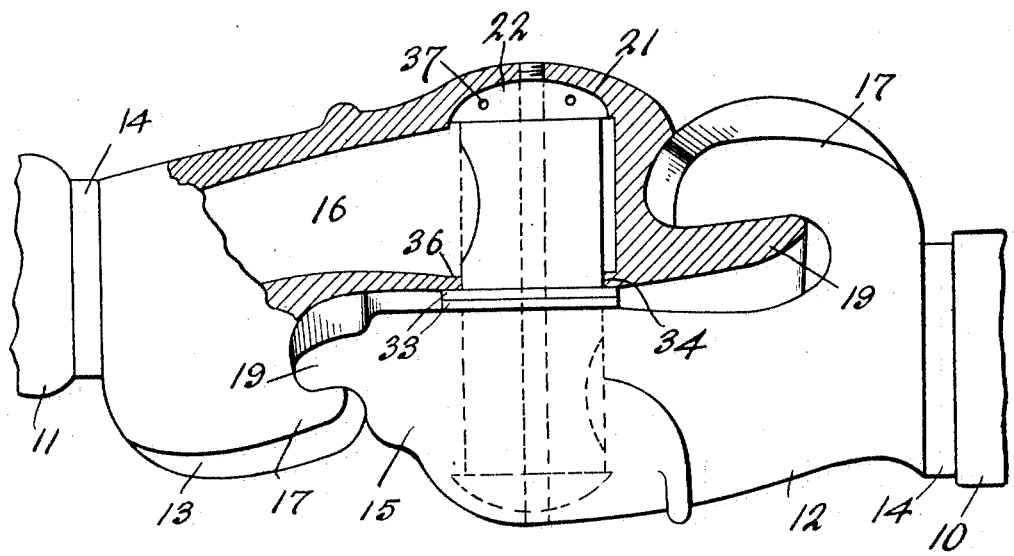
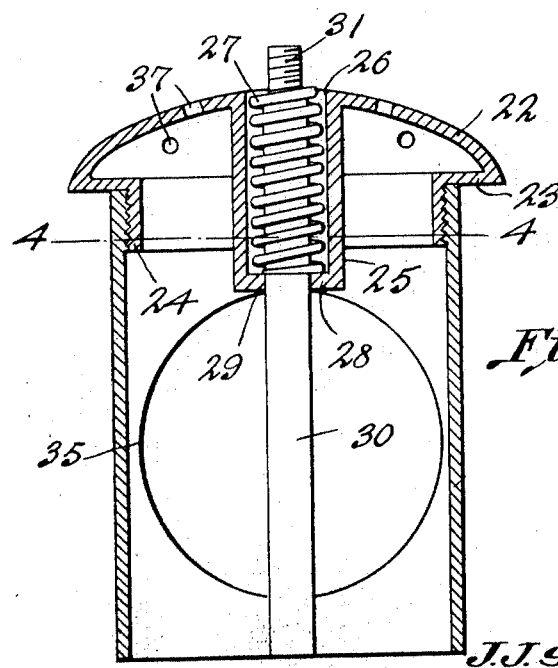
J. J. Stafford
H. C. Rhodehamel
E. J. Schoenlaub, Inventors
By Geo. Kimmel
Attorney J. J. STAFFORD, H. C. RHODEHAMEL AND E. J. SCHOENLAUB.
AUTOMATIC SLIDE VALVE.
APPLICATION FILED AUG. 2, 1918.

1,315,797.

Patented Sept. 9, 1919.
2 SHEETS—SHEET 2.

J. J. Stafford
H. C. Rhodehamel,
E. J. Schoenland, Inventors

By Geo. P. Kimmel
Attorney

UNITED STATES PATENT OFFICE.

JOHN J. STAFFORD, HENRY C. RHODEHAMEL, AND ELMER J. SCHOENLAUB, OF MARION, OHIO.

AUTOMATIC SLIDE-VALVE.

1,315,797.  Specification of Letters Patent.  Patented Sept. 9, 1919.

Application filed August 2, 1918. Serial No. 247,961.

*To all whom it may concern:*

Be it known that we, JOHN J. STAFFORD, HENRY C. RHODEHAMEL, and ELMER J. SCHOENLAUB, citizens of the United States, and residents of Marion, in the county of Marion and State of Ohio, have invented certain new and useful Improvements in Automatic Slide-Valves, of which the following is a specification.

This invention relates to improvements in brake appliances for railroad rolling stock and more particularly as used upon steam or electrically driven trains or cars, the object thereof being to provide an improved automatic slide valve adapted to be associated with the air hose couplings of the brake system of a train, whereby emergency or quick action in the application of the air brakes of a train will be prevented in the event of train separation, and at the same time to automatically set the brakes on both sections of a broken train, at a normal rate or service application of pressure, thereby preventing the jamming of the brakes and eliminating the shock resulting from the emergency action of the air brakes in the event of train separation which has been the cause of a number of accidents of a serious nature.

A further object of the invention is to provide a valve adapted to be associated with the air hose couplings and to so act that when the couplings are in position to connect the train line pipe the passage through the same will be continuous and the device will be unaffected by or interfere with the action of the air, in applying the brakes, or with any application of the same which the engineer desires to make, or has no part in the braking power of the train, providing the angle cocks and other parts or equipments of the air brakes are in proper position or order, but will serve to properly apply the brakes upon the separation of the couplings, so as to gradually bring the separated parts of the train to a stop.

With the above and other objects in view, as will appear as the description proceeds, the invention comprises the various novel features of construction and arrangement of parts which will be more fully described herein and set forth with particularity in the claims appended hereto.

Reference is had to the accompanying drawings, forming a part of this application, in which like reference characters indicate the corresponding parts throughout the several views, in which, Figure 1 is a plan view partly in section of an air hose or train pipe coupling equipped with our improved automatic slide valve.

Fig. 3 is an enlarged sectional view of our improved automatic slide valve, and

Figure 2:
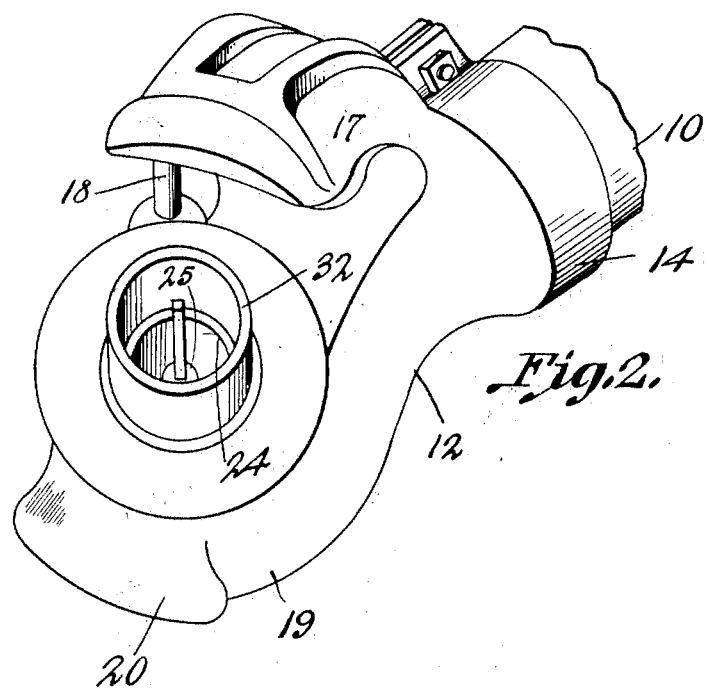
Fig. 2 is a perspective view of one end of a coupling, train pipe or air hose, showing the action of the device when the couplings are separated.
Figure 4:
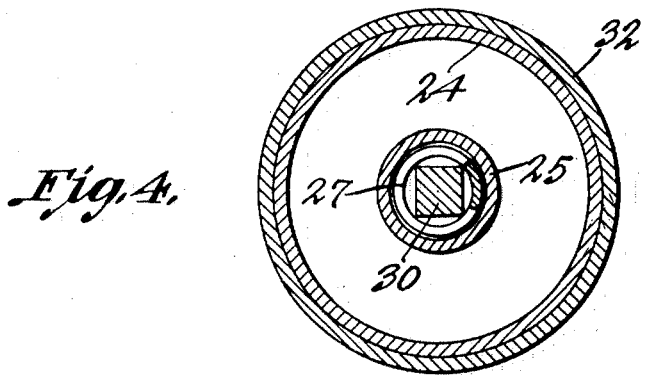
Fig. 4 is a cross sectional view of the valve.

Referring to the drawings in detail, 10 and 11 designate the ends or terminals of the air hose or train pipes upon respective cars of a train, adapted to be coupled through the medium of the coupling members 12 and 13. Each of these members are constructed similarly and suitably fastened to the hose or pipes 10 and 11, as shown at 14, each coupling being provided with a jaw or extension 15 having a passage 16 leading therethrough and communicating with the bores of the hose or pipe. The jaws 15 are offset to one side, and provided in spaced relation with respect thereto are clamping jaws 17 suitably reinforced and provided therebetween with a limiting member or pin 18 designed to be engaged by corresponding extensions 19 on each coupling member for limiting the coupling displacement thereof in alined or horizontal position, when the train pipes are connected to establish communication between the passages 16 for rendering the train line continuous as will be readily understood.

The extreme end or nose of each jaw 15 is beveled as shown at 20, so as to effect a tight connection between the coupling members so as to bring the faces thereof in air-tight relation, when the coupling members are joined as specified, first by disposing the jaws at right angles to each other and then bringing them into alinement for the purpose specified. At the inner wall of the passage 16 in each jaw there is provided a recess or seat 21 designed for coöperation with our improved slide valve, as will be hereinafter particularly pointed out.

The valve proper includes a mushroom like valve head 22 of convex formation designed to engage the seat 21 and having an inturned and flat flange portion 23 with an externally threaded axially projecting extension 24. In other words, the head is of concavo-convex formation and is provided with a central spring chamber 25 projecting from its concaved side and producing a chamber 26 open at the convex side of the valve head continuously of the bore thereof, so as to receive an expansible spring 27. The end wall 28 is provided with a square aperture 29 receiving a stem 30 of similar cross section therethrough, said stem also extending through the coil spring and having a reduced and projecting threaded end 31 anchored in the casing of the coupling at the seat 21. Secured to the extension 24 is a cylindrical part or valve tumbler 32 internally threaded for attachment to the externally threaded extension 24, and having at its opposite end an outwardly extending packing gland or washer 33 and designed to coöperate with an opposed gland to produce an airtight connection between the coupling members. The valve tumbler 32 is slidably received in the opening 34 in the coupling face designed to engage with a coacting coupling member, and inasmuch as the stem 30 is fixed to the casing of the coupling and the valve is slidable thereon, a two-part bearing is provided preventing rotation of the valve and thereby holding an opening 35 in the valve coupler in alinement with the passage 16, so as to normally establish communication between said respective passages when the coupling members are brought together, in the manner shown in Fig. 1 of the drawings, and said valves are forced onto the seats 21 against the action of the expansible coil springs 27. The packing glands or washers 33 during this engagement are brought into frictional contact so as to establish an airtight connection with intervening gaskets or packings if desired, but when the couplings are separated, the springs 27 act upon the valves to project the same in the manner shown in Fig. 2 of the drawings, whereby the valve portion 23 will be brought into engagement with the seat 36, thereby effectively closing the hose or pipe gradually and in such a manner as to slowly apply the brake under control of the spring at a normal rate or service application of pressure. A valve tumbler being projected, the opening 35 will be disposed beyond the seat 36 gradually closing as it is projected by the spring, thereby gradually diminishing the exhausting of the train pipe in the application of the brakes for effectively braking both sections of a broken train to prevent the emergency action of the air brakes and eliminate the shock which would ordinarily result from the emergency action or jamming of the air brakes, in the event of train separation, and, obviously, eliminating accident due to such cause. The device is in the nature of a safety device, but when a train is coupled up ready for operation, the valve does not interfere with or has any part to do with the action of the operation of the air or air brakes, and the engineer in charge can make any sort of application he needs without the slightest effect upon the valve in question. In order to regulate the application of the brakes, in addition to the gradual closing of the port or opening 35, the valve head may be provided with a series of bleed ducts 37, normally closed when the valve head is seated, but open to permit the gradual escape of the air from the train pipe, in applying the brakes when the uncoupling takes place. Attention is also called to the fact that the valve has no power in the braking power of the train, providing the angle cocks or other parts or equipment connected with the air brakes are in proper position or order and, obviously, if the train separation would be caused by worn out or deficient air hose breaking, the valve, of course, would have no action, as stated, but this is a circumstance very unlikely to occur in view of the vigilance connected with the inspection of the rolling stock.

From the foregoing description taken in connection with the accompanying drawings, it is thought that a clear and comprehensive understanding of the construction, operation, and advantages of our invention may be had, and while we have shown and described the device as embodying a specific structure, we desire that it be understood that such changes may be made in said structure as do not depart from the spirit and scope of the invention as claimed.

Having thus described our invention, what we claim is new, and desire to secure by Letters Patent, is:

1. The combination with a train line hose coupling having a lateral opening and a passageway therethrough, said coupling including a casing having a valve seat opposite said opening, a squared stem secured in the casing, a valve having a head portion coöperating with said seat, said valve being slidable on the stem, means normally projecting the valve head and tumbler, said tumbler having an opening therethrough designed to establish communication through the passageway and through said first named opening when the spring is compressed and the valve seated and said head being designed to seat against the opposite side of the casing adjacent said opening to close said passageway when the tumbler is projected, said valve head having openings therein adapted to form bleed ducts when the tumbler portions are projected and receiving means for the springs adapted to engage the rectangular stems for holding said valve tumblers and valve against rotation and to guide the same during their sliding movement, as and for the purposes specified.

2. An automatic slide valve of the class described, comprising a mushroom-shaped valve head having a flat seat extended inwardly and an axial projection externally threaded, a tumbler threaded on to said projection and having an opening therethrough, said head having an inwardly extending chamber provided with a polygonal-shaped opening, an expansible spring in said chamber, said chamber being open at the valve head end, and a valve stem also of polygonal cross section and received within said polygonal opening to permit sliding movement of the valve thereon and to hold the same against rotation, said valve having an anchoring end, as and for the purpose specified.

3. In a device of the class described coacting body members having registering air passages therethrough and each with an internal valve seat, a tubular valve in each body member and in contact when the body members are in closed relation, each valve having a lateral port communicating respectively with the passages of the body members and a laterally directed head providing a seat to engage the internal seats of the body members, an outwardly opening chamber within each valve head, a guide stem connected to each body member and extending respectively through the chambers, and a spring within each chamber and operating to yieldably support the valves and move them outwardly to cut off the flow when the body members are separated.

In testimony whereof we affix our signatures hereto.

JOHN J. STAFFORD.
HENRY C. RHODEHAMEL.
ELMER J. SCHOENLAUB.

Copies of this patent may be obtained for five cents each, by addressing the "Commissioner of Patents, Washington, D. C."